United States Patent
Villemagne et al.

(10) Patent No.: US 10,767,132 B2
(45) Date of Patent: *Sep. 8, 2020

(54) GUIDING MEMBER IN THE FORM OF A METAL RING FOR ASSEMBLY WITH FRICTION AND WITH THE ARTICULATING AND/OR SLIDING CAPABILITY OF A SHAFT

(71) Applicant: H.E.F., Andrezieux Boutheon (FR)

(72) Inventors: Patrick Villemagne, Saint-etienne (FR); Georges Godard, Saint-germain-laval (FR)

(73) Assignee: H.E.F., Andrezieux Boutheon (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/649,410

(22) PCT Filed: Dec. 6, 2013

(86) PCT No.: PCT/FR2013/052965
§ 371 (c)(1),
(2) Date: Jun. 3, 2015

(87) PCT Pub. No.: WO2014/091123
PCT Pub. Date: Jun. 19, 2014

(65) Prior Publication Data
US 2015/0307801 A1    Oct. 29, 2015

(30) Foreign Application Priority Data
Dec. 13, 2012    (FR) ...................................... 12 61981

(51) Int. Cl.
*C10M 107/38*    (2006.01)
*F16C 33/10*    (2006.01)
(Continued)

(52) U.S. Cl.
CPC .... *C10M 107/38* (2013.01); *C10M 175/0083* (2013.01); *F16C 33/102* (2013.01);
(Continued)

(58) Field of Classification Search
CPC ............ C10M 175/0083; F16C 33/102; F16C 2202/52; F16C 2202/54; F16C 2202/66
See application file for complete search history.

(56) References Cited

U.S. PATENT DOCUMENTS 4,868,067 A * 9/1989 Fujisawa ................. C22C 49/14
123/193.4
6,197,370 B1 * 3/2001 Rao .......................... B05B 1/02
427/236
(Continued)

FOREIGN PATENT DOCUMENTS

FR        2 882 409 A1      8/2006
JP        2002339083 A   * 11/2002
WO       2012/127759 A1     9/2012

OTHER PUBLICATIONS

International Search Report for International Application No. PCT/FR2013/052965, dated Feb. 17, 2014.
(Continued)

*Primary Examiner* — Taiwo Oladapo
(74) *Attorney, Agent, or Firm* — Heslin Rothenberg Farley & Mesiti P.C.

(57) ABSTRACT

The bore of the ring has workings suitable to act as a grease reserve at a friction area. A self-lubricating coating layer with a low wettability is applied to the entire surface of the bore, including in the workings suitable to act as a grease reserve, such that after wearing of the layer of self-lubricating coating at the friction surface of the bore, the difference in wettability between the friction surface and the workings (Continued)

still having the coating layer, enables the grease to be drawn out of the workings in order to lubricate the friction area.

12 Claims, 2 Drawing Sheets

(51) Int. Cl.
*F16C 33/20* (2006.01)
*C10M 175/00* (2006.01)
*F16C 17/02* (2006.01)

(52) U.S. Cl.
CPC .......... *F16C 33/1095* (2013.01); *F16C 33/20* (2013.01); *F16C 17/02* (2013.01); *F16C 2202/50* (2013.01); *F16C 2202/66* (2013.01); *F16C 2208/32* (2013.01)

(56) References Cited

U.S. PATENT DOCUMENTS

| | | | | |
|---|---|---|---|---|
| 7,938,582 B2 * | 5/2011 | Barlerin | .................. | F16C 17/02 |
| | | | | 384/276 |
| 2008/0152271 A1 * | 6/2008 | Barlerin | .................. | F16C 17/02 |
| | | | | 384/322 |
| 2012/0142566 A1 * | 6/2012 | Yamamoto | ........... | C10M 169/06 |
| | | | | 508/385 |

OTHER PUBLICATIONS

"Permaglide Gleitlager", Karl Schmidt GmbH, Federal Republic of Germany, XP002711059, Dec. 31, 1983, pp. 19, 20, 31.

* cited by examiner

GUIDING MEMBER IN THE FORM OF A METAL RING FOR ASSEMBLY WITH FRICTION AND WITH THE ARTICULATING AND/OR SLIDING CAPABILITY OF A SHAFT

CROSS REFERENCE TO RELATED APPLICATIONS

This application is a national stage filing under section 371 of International Application No. PCT/FR2013/052965, filed on Dec. 6, 2013, and published in French on Jun. 19, 2014, as WO 2014/091123 A1 and claims priority of French application 1261981 filed on Dec. 13, 2012, the entire disclosure of these applications being hereby incorporated herein by reference.

BACKGROUND ART

The invention concerns a self-lubricating guidance device for any kind of articulation.

The invention has particularly advantageous applications for ring or rotary joints, or for slides with workings suitable to act as a grease reserve, with the aim of enabling lubrication only during assembly and/or lubrications at very long time intervals.

These workings suitable to act as a grease reserve can consist of holes, cells, grooves, grids, etc.

A solution of this type is covered in patent FR 2 882 409.

In this state of the art, the grease contained in the bottom of the workings suitable to act is a grease reserve has difficulties in positioning itself between, for example, the shaft and the bearing, in order to lubricate the contact and friction area.

This is notably the case when the workings suitable to act as a grease reserve are deep.

The result is that the grease tends to remain in the bottom of the workings and, after a time, is no longer able to fulfill its lubrication function in the contact area.

The invention is intended to remedy these disadvantages in a simple, safe, effective and rational manner.

The problem that the invention is designed to resolve is to enable the grease contained in the workings within the ring or other component to supply the surfaces in contact during operation.

BRIEF SUMMARY THE INVENTION

To resolve such a problem, a self-lubricating coating with low wettability is applied to the entire surface of the said bore, including in the workings suitable to act a grease reserve, such that after wearing of the layer of self-lubricating coating at the friction surface of the bore, the difference in wettability between the said friction surface and the workings still having the coating, enables the grease to be drawn out of the said workings in order to lubricate the said friction surface.

According to another characteristic, the low-wettability self-lubricating coating is based on PTFE, MoS2 or Graphite, for example.

The workings capable of acting as a grease reserve can be composed, in a known manner, of holes, cells, grooves (which grooves can form a grid), chevrons, etc.

BRIEF DESCRIPTION OF THE DRAWING FIGURES

The invention will be explained below in more detail, with the aid of the appended drawings, in which.

DETAILED DESCRIPTION

Figure 1:
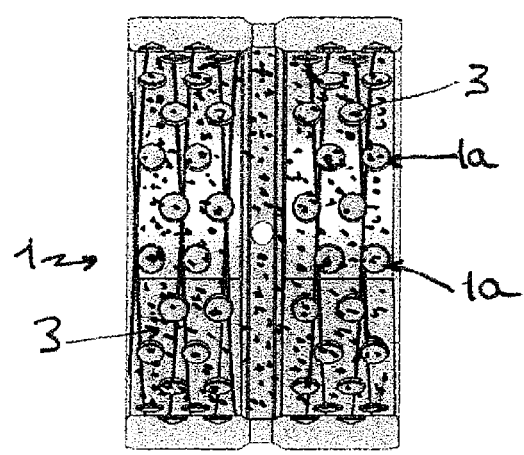
FIG. 1 is a longitudinal cross section in schematic form, according to one implementation, of a guidance device in ring form for the mounting of a pin with friction and articulation capability; the ring is illustrated as before wear occurs, and the self-lubricating coating is symbolized by points.
Figure 2:
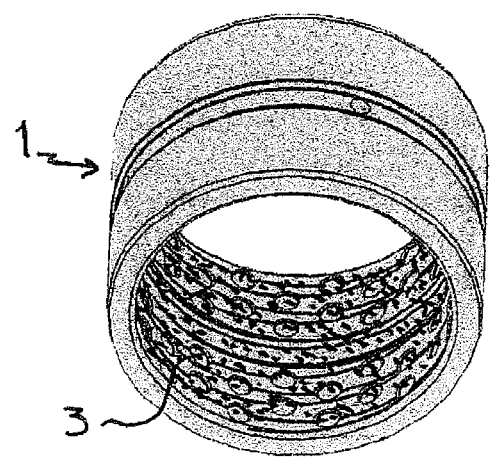
FIG. 2 is a view in perspective of the ring, in accordance with the conditions in FIG. 1.

We have illustrated (FIG. 1) for example of implementation of a guidance device in the form of a cylindrical body (1) such as a ring, with a coaxial boring for the assembly and friction of a pin articulating and sliding in combination with the grease.

The grease is contained in the workings (1a) in the bore of the ring. For example, the workings (1a) can be composed of holes, cells, grooves, etc.

Moreover, the grooves can form a grid or chevrons. The cylindrical body (1) that constitutes the ring is implemented from any type of material with a high resistance to wear and/or seizure, and to corrosion under extreme operating conditions, notably in the presence of high pressure, corrosion and abrasion.

In a known manner, the cylindrical body (1)—notably its bore—can undergo any type of surface treatment.

You are reminded that, by guidance device, we mean any type of bearings, slides, rotary joints, etc.

According to a characteristic that is fundamental to the invention, a low-wettability, self-lubricating coating (3) is applied to all of the friction area of the bore of the ring (1), including in the workings (1a) suitable to act as a grease reserve.

Figure 3:
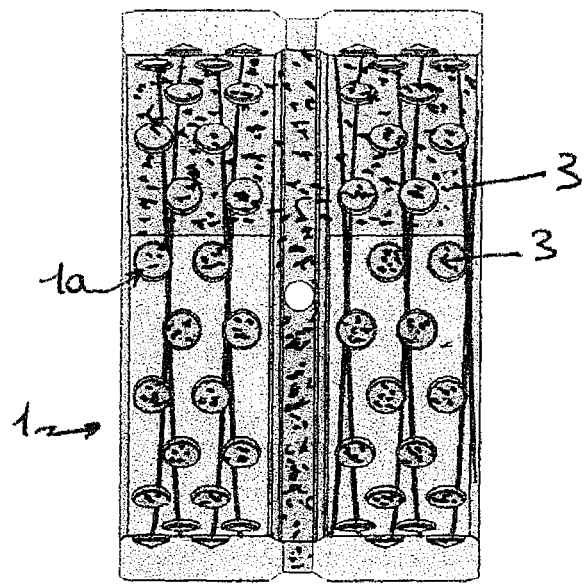
FIG. 3 is a longitudinal cross section of the ring after wearing of the coating over a part of the bore, with the self-lubricating coating remaining in the cavities; the debris from the said coating of the worn area is mixing with the grease, and accumulates in order to lake part in lubrication.
Figure 4:
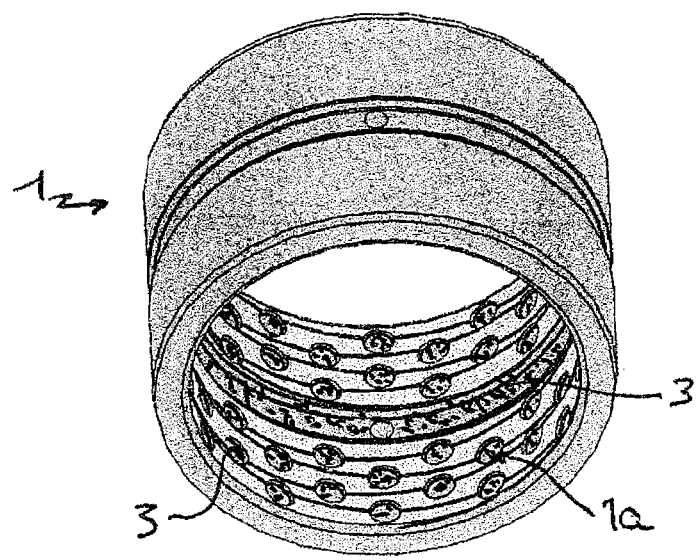
FIG. 4 is a view in perspective of the ring, in accordance with the conditions in FIG. 3.

The result of these arrangements is that, after wearing of the self-lubricating coating layer (3) at the friction area of the bore—after a certain length of time of operation—the difference in wettability between the said friction area no longer having the coating and the workings suitable to act as a grease reserve but still having the coating naturally tends to draw the grease out of the said workings, so that it lubricates the said friction surface (FIGS. 3 and 4).

The low-wettability self-lubricating coating (3) can be based on PTFE, MoS2, Graphite, etc.

As explained above, after total consumption of the self-lubricating coating layer at its friction surface, the said coating is present only in the holes, cells or other means constituting the grease reserves.

The advantages come to the fore clearly in the description. We emphasize and remind you that it is consequently possible to use all the grease contained in the workings in the bore of the ring or other component at the friction surface, in order to lengthen the intervals of time at which lubrication can be carried out.

Note that the working suitable to act as a grease reserve can be positioned between grooves formed at each end of the ring's bore.

You are referred to the comparative tests below, between a ring in accordance with the state of the art—i.e. without self-lubricating coating—and a ring according to the invention, i.e. with a low-wettability coating applied at the friction surface and the workings suitable to act as a grease reserve.

Ring According to the State of the Art:
Type of pin: 16 NC 6 CT Ra: 0.4
Nature of the bearing: gridded ring
Dimensions of bearing: Inside Ø: 30 mm, outside Ø: 36 mm, width of the friction area: 20 mm
Movement: alternating rotation over 100 degrees
Pressure calculated at projected surface: 50 Mpa
Sliding speed: 8 mm per sec
Extreme pressure of grease: containing lithium soap, type SNR-LUB EP grade NLGI 2
Lubrication during assembly and then operation without additional grease.
Result of Tests:
Number of oscillations before first increase in the friction factor: 160,000 cycles.
Ring According to the Invention
Type of pin: 16 NC 6 CT Ra: 0.4.
Nature of the bearing: gridded ring
Dimensions of bearing: Inside Ø: 30 mm, outside Ø: 36 mm, width of the friction area: 20 mm
Movement: alternating rotation over 100 degrees
Pressure calculated at projected surface: 50 Mpa
Sliding speed: 8 mm per sec
Extreme pressure of grease: containing lithium soap, type SNR-LUB EP grade NLGI 2
Lubrication during assembly and then operation without additional grease.
Result of Tests:
Number of oscillations before fast increase in the friction factor: >320,000 cycles (test stopped before its ending).

The invention claimed is:
1. A guidance device, comprising:
a metal ring with a bore for assembly with a pin with friction and with a capability for articulation and/or sliding of the pin, the bore having a friction surface and workings suitable to act as a grease reserve to the friction surface, at least the friction surface of the bore having a first wettability,
wherein the friction surface and the workings are provided with a solid layer of self-lubricating coating having a second wettability and being overlaid with grease,
wherein the second wettability is inferior to the first wettability with respect to the grease,
wherein after total wearing of the self-lubricating coating at the friction surface of the bore, a difference in wettability between the friction surface and the workings still having the solid layer of self-lubricating coating is configured to draw out grease from the workings so as to lubricate the friction surface devoid of the solid layer of self-lubricating coating, and
wherein the coating is configured such that if applied to a bearing with a friction surface that is 20 mm wide and of a 30 mm interior diameter, and a 16 NC 6 grade steel pin that is cemented and hardened, and has a surface roughness Ra 0.4 µm, is alternatingly rotated in the bearing over 100 degrees with a surface pressure of about 50 Mpa at a sliding speed of 8 mm/sec, and the bearing is greased only prior to assembly with a grease containing lithium soap, the friction factor between the pin and the bearing does not increase to the point of failure prior to 320,000 cycles.

2. The guidance device according to claim 1, wherein the self-lubricating coating is based on PTFE.

3. The guidance device according to claim 1, wherein the self-lubricating coating is based on MoS2.

4. The guidance device according to claim 1, wherein the self-lubricating coating is based on Graphite.

5. The guidance device according to claim 1, wherein the workings comprise holes or cells.

6. The guidance device according to claim 1, wherein the workings comprise grooves.

7. The guidance device according to claim 6, wherein the grooves form a grid.

8. The guidance device according to claim 6, wherein the grooves form chevrons.

9. The guidance device according to claim 1, wherein the workings are positioned between grooves formed at each end of the bore.

10. The guidance device according to claim 1, wherein the self-lubricating coating is configured to be abraded by the articulation and/or sliding of the pin.

11. The guidance device according to claim 10, wherein, in a first state of the guidance device, the friction surface and the workings include the self-lubricating coating thereon, and wherein, in a second state of the guidance device after articulation and/or sliding operation of the pin within the bore in the first state of the guidance device, at least a portion of the friction surface that is contiguous with the workings is void of the self-lubricating coating such that there is the difference in wettability between the workings with the self-lubricating coating and at least the portion of the friction surface that is void of the self-lubricating coating.

12. The guidance device according to claim 1, wherein the self-lubricating coating is formed on surface treatment on the bore.

* * * * *